United States Patent
Moeder

(10) Patent No.: US 6,168,739 B1
(45) Date of Patent: Jan. 2, 2001

(54) SHEET MATERIAL

(75) Inventor: Claudio Moeder, Voghera (IT)

(73) Assignee: FRA. MO Snc di Franca Riva & C (IT)

(*) Notice: Under 35 U.S.C. 154(b), the term of this patent shall be extended for 0 days.

(21) Appl. No.: 09/101,478

(22) PCT Filed: Jan. 9, 1997

(86) PCT No.: PCT/GB97/00050

§ 371 Date: Jul. 19, 1999

§ 102(e) Date: Jul. 19, 1999

(87) PCT Pub. No.: WO97/25197

PCT Pub. Date: Jul. 17, 1997

(30) Foreign Application Priority Data

Jan. 10, 1996 (GB) .................................... 9600450

(51) Int. Cl.[7] .................................................. B32B 31/00
(52) U.S. Cl. .................. 264/177.1; 264/177.12; 264/209.1; 156/244.13
(58) Field of Search .................. 428/178, 188; 156/242, 244.11, 244.13; 264/76.1, 177.1, 177.12, 209.1

(56) References Cited

U.S. PATENT DOCUMENTS

| 3,641,230 | 2/1972 | Jenks . | |
|---|---|---|---|
| 4,106,588 | 8/1978 | Moore et al. . | |
| 5,360,500 | * 11/1994 | Evans et al. | ............. 156/74 |

FOREIGN PATENT DOCUMENTS

| 2235785 | 1/1975 | (FR) . |
| 2284444 | 4/1976 | (FR) . |
| 2543055 | 9/1984 | (FR) . |
| 0587282 | 4/1947 | (GB) . |

OTHER PUBLICATIONS

PCT/GB91/00583—Publication GB 2197618 A—UK Patent Application.

* cited by examiner

*Primary Examiner*—Donald Loney
(74) *Attorney, Agent, or Firm*—Howard & Howard

(57) ABSTRACT

A rigid or semi-rigid plastics sheet material comprises a pair of opposed faces (20,22) between which run elongate voids defined by interconnections (24,25) between the two opposite faces, the cross sectional shape of at least some of the voids being a polygon with more than four sides, preferably a repeating pattern of regular hexagons or octagons joined in a line at adjacent sides or apices and including triangular secondary voids therebetween. Advantages include higher strength, lighter weight and faster cooling during the extrusion process.

8 Claims, 9 Drawing Sheets

Figure 1:
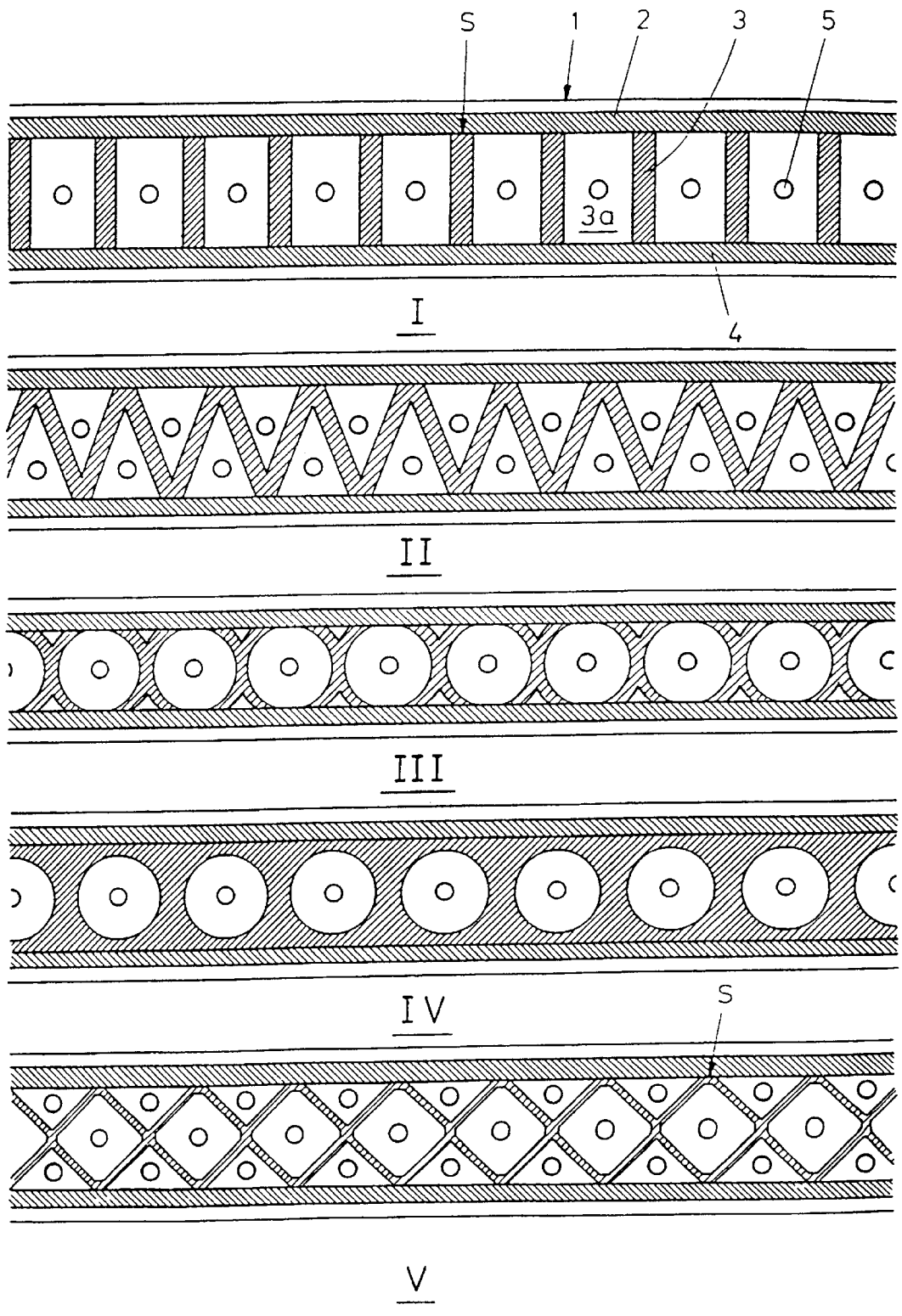

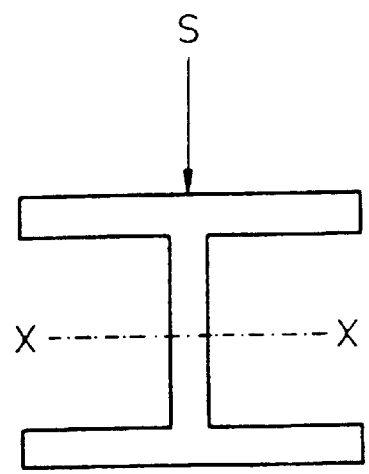
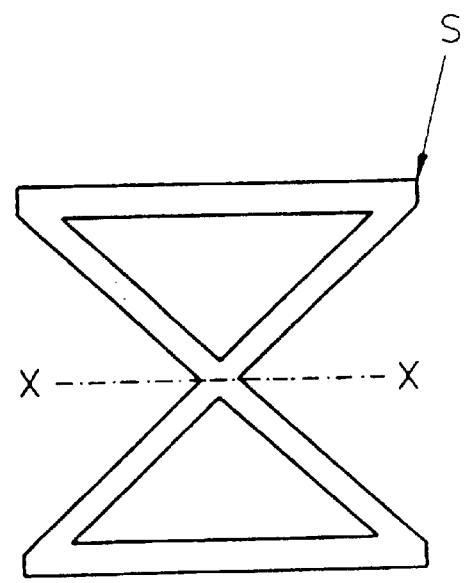
FIG. 2

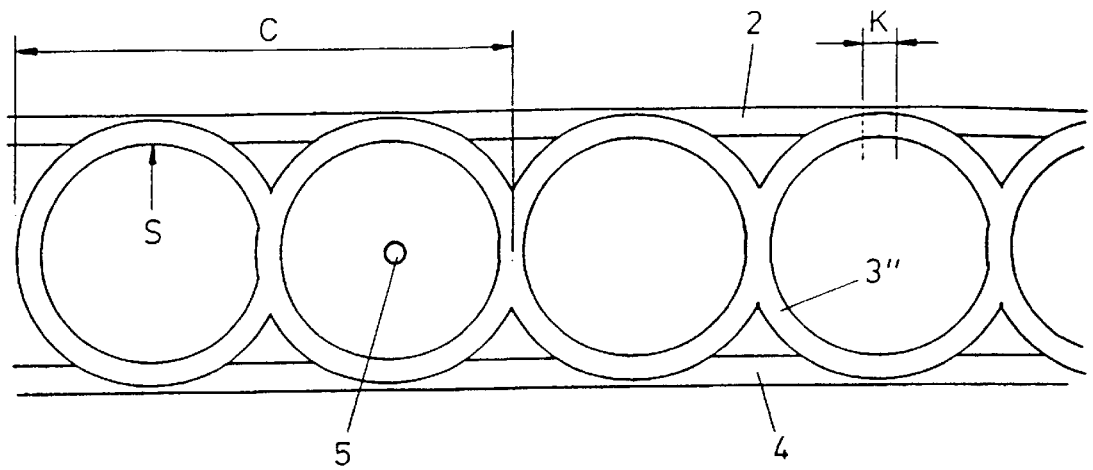
CIRCULAR VOIDS INTERCONNECTED STRUCTURE (III & IV)
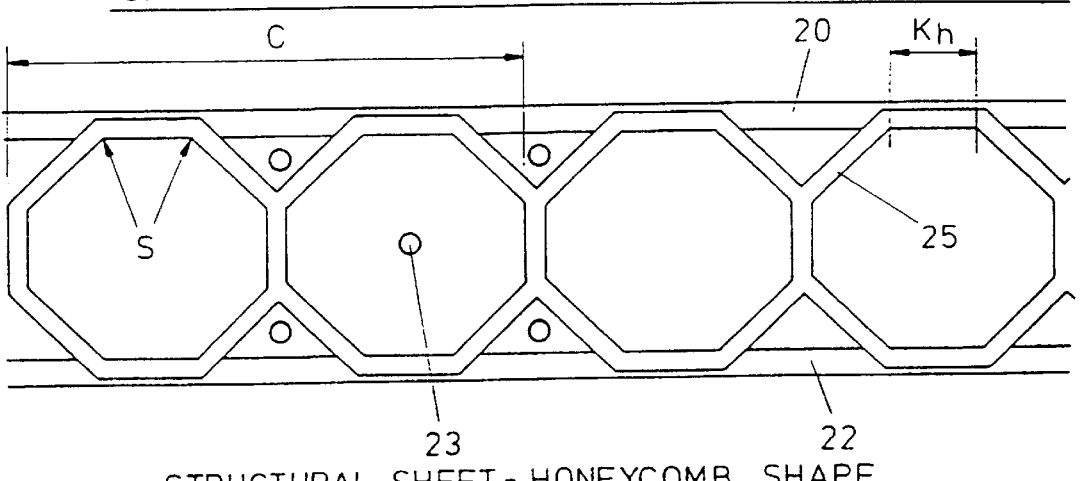
STRUCTURAL SHEET - HONEYCOMB SHAPE
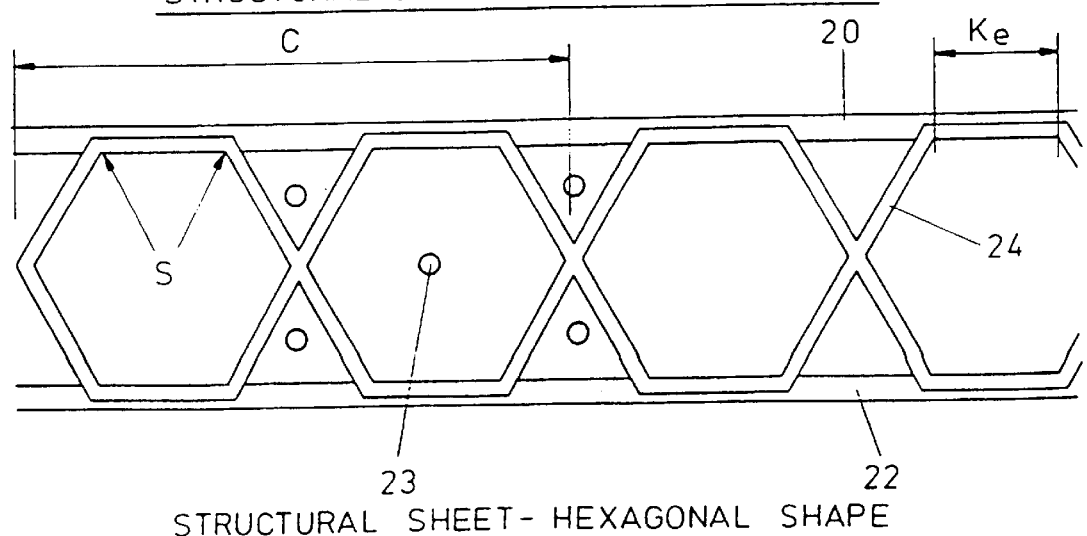
STRUCTURAL SHEET - HEXAGONAL SHAPE
FIG. 4

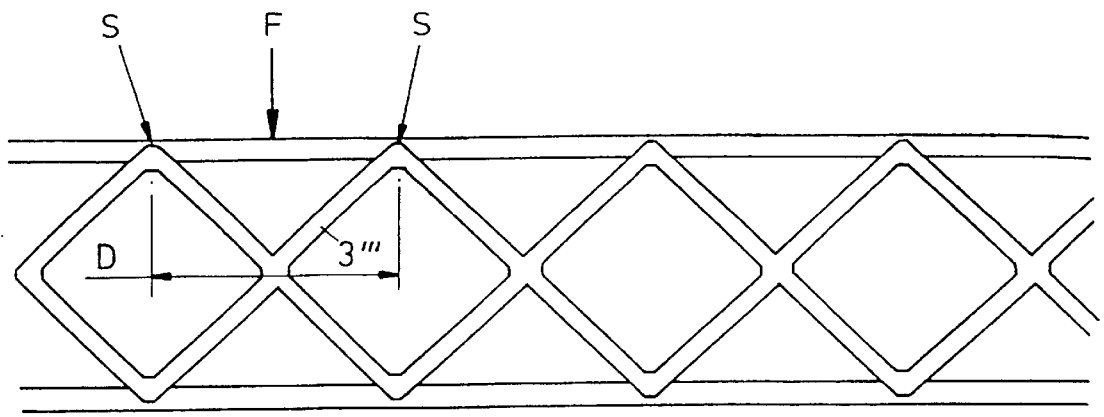
CRISS-CROSS STRUCTURE (V)
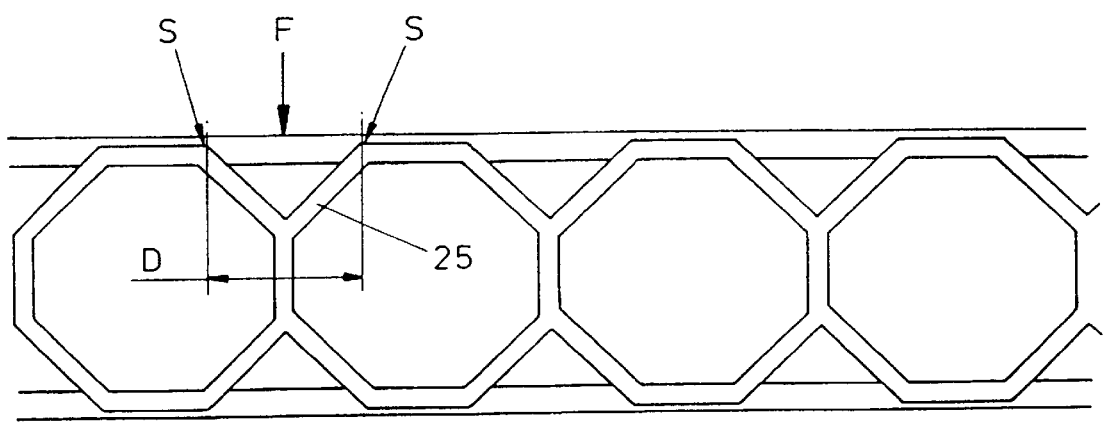
STRUCTURAL SHEET - HONEYCOMB SHAPE
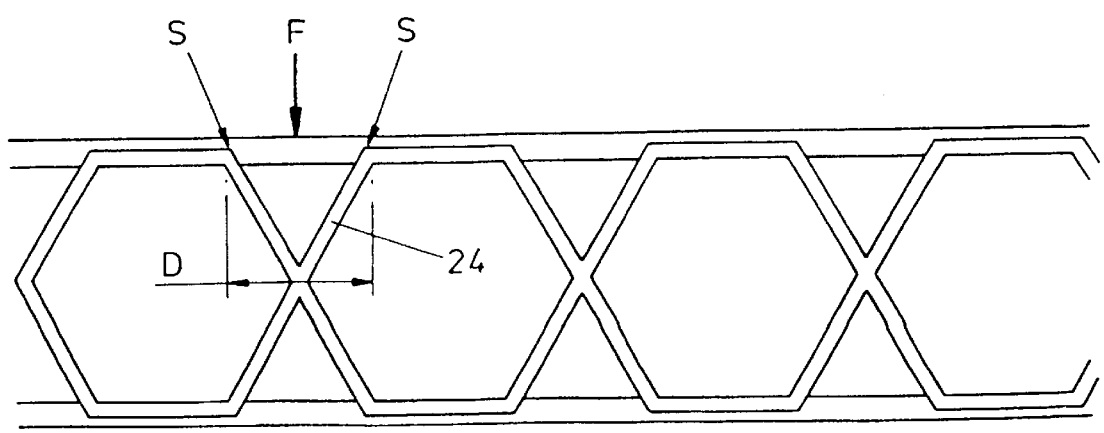
STRUCTURAL SHEET - HEXAGONAL SHAPE
FIG. 6

SHEET MATERIAL

The present invention relates to an improved extruded plastics sheet material having voids therein, having particularly useful application to the packaging of food products, especially fresh fruit and vegetables.

PCT patent Specification No WO 91/16243 describes such an extruded sheet material comprising a pair of opposed faces between which run a series of elongate voids arranged such that there are two series of interconnections between the two faces, these two series joining one another where they meet, to form a "criss-cross" structure of interconnecting beams. Other shapes of voids are also described, including circular and oval. The voids reduce the weight of the sheet whilst the interconnections enhance the strength against both compressive and buckling forces. An "I" beam structure is also commonly used, in which the opposed walls are separated by lateral support members.

This type of sheet is generally extruded through a suitably shaped die into the space between upper and lower plates. In order to cool the extruded sheet, the plates (known as a "calibrator") are water cooled and air is also blown through air nozzles in the die, into the elongate voids, although the latter has a lesser effect due to the air being heated during its passage through the voids. In addition, to sustain the sheet during cooling, a vacuum is applied to the plates.

Any attempts to increase the strength of the sheet (which necessitates increase in the sheet weight and/or thickness) result in longer cooling times, hence slower overall production.

Strength tests show that the traditional "I" beam structure gives the best resistance to vertical compressive force applied at the point where a lateral support contacts the sheet face, but that resistance to buckling demonstrated by the "criss-cross" structure is about three times greater than the traditional "I" beam structure (as determined by the Euler Load Ratio).

The present invention therefore seeks to provide an improve structure of voids, which maximises mechanical performance, minimises sheet weight and is cooled faster during the extrusion process.

According to the present invention there is provided a rigid or semi-rigid plastics sheet material comprising a pair of opposed faces between which run elongate voids defined by interconnections between the two opposite faces, the cross sectional shape of at least some of the voids being a polygon with more then four sides.

The polygon may be regular or irregular, but the preferred embodiments utilise a repeating pattern of regular octagons or hexagons (hereinafter referred to as the primary voids).

Preferably, the hexagonal or octagonal voids are joined together at one side or at one apex.

The spaces between adjacent hexagonal or octagonal voids may be filled in with suitable plastics material, but it is preferred that these spaces comprise smaller polygonal voids (hereinafter referred to as the secondary voids) whose shape will be determined by the particular shape chosen for the primary voids (triangular secondary voids for hexagonal or octagonal primary voids).

These voids are easily extruded integrally with the sheet in one pass through a suitably shaped die, and suitable materials for the sheet include thermoplastics such as a polyolefin eg polyethylene or polypropylene.

The opposed faces may be external faces, or one or more may be an internal face if the sheet is part of a more complicated cross-sectional profile.

Preferably, each primary void and each secondary void has at least one associated air inlet point, with more than one air inlet per void giving improved cooling in relation to the air blown through the sheet during extrusion.

There are a number of advantages of hexagonal or octagonal primary voids over the generally square primary voids (i.e "criss-cross" interconnecting beam structure) illustrated in the preferred embodiment of PCT Patent Specification No WO 91/16243. One is that each hexagonal or octagonal void gives two contact points with each of the two opposed faces, whereas the "criss-cross" structure gives only one per face per square void, resulting in better resistance to compressive forces (particulary as determined by the flat crush test or FCT). Also, the hexagonal or octagonal void gives a much larger area in contact with the sheet faces resulting in much faster cooling by the calibrator plates. The distance between two adjacent cells is also greater, giving a lighter sheet. Finally, it is not necessary to take special steps to avoid sharp corners in contrast to WO 91/16243.

Figure 3:
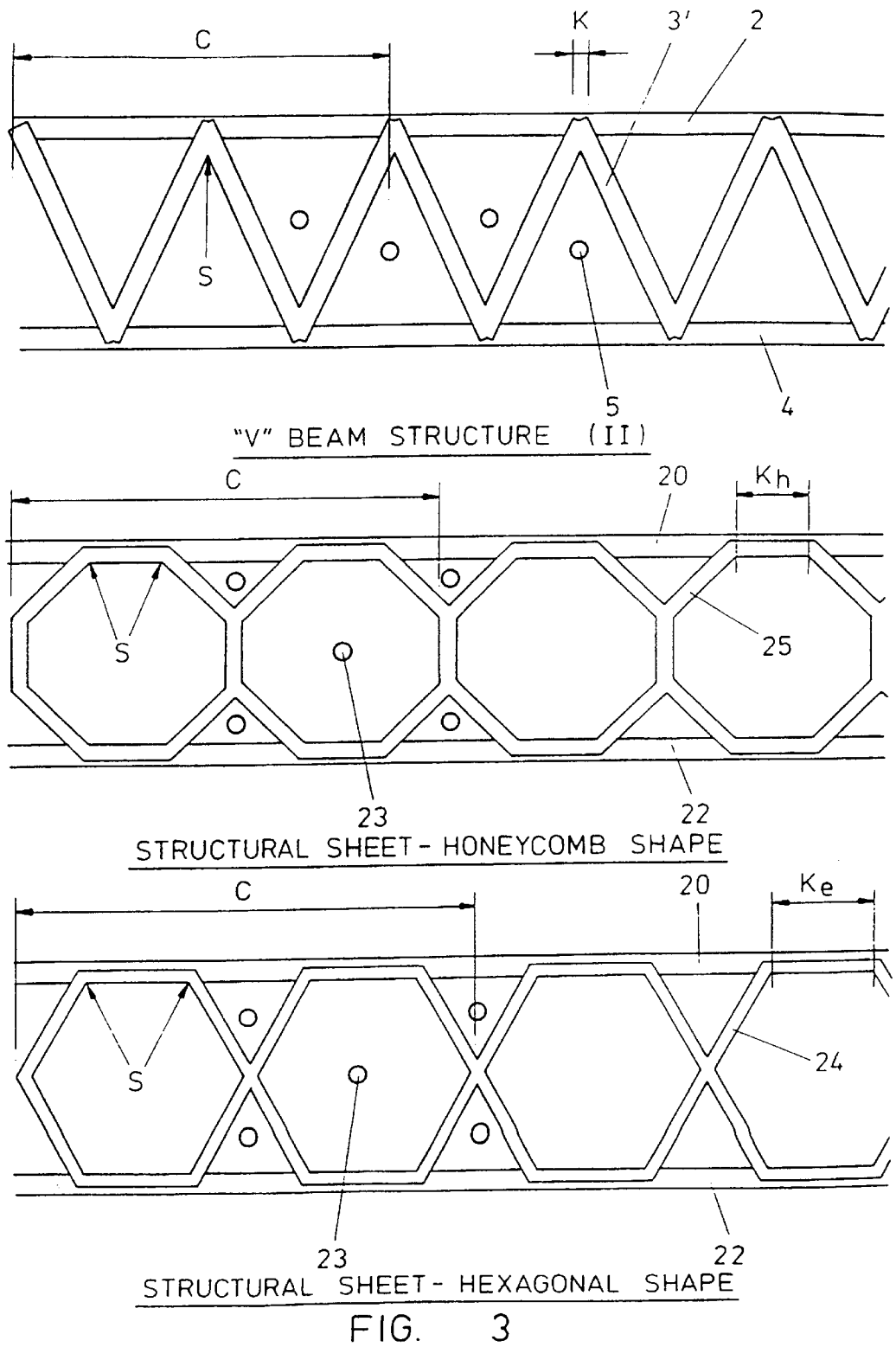
Figure 5:
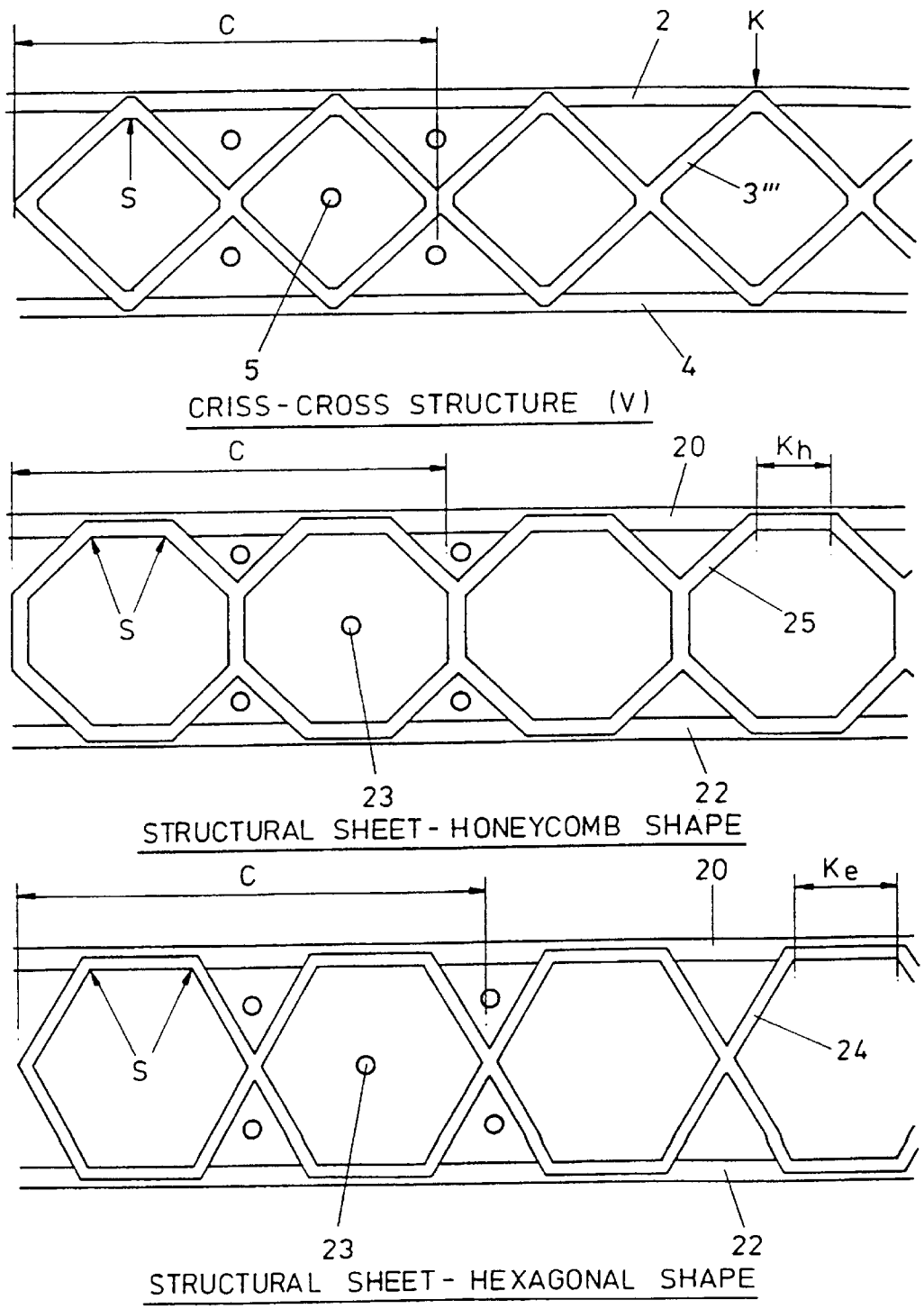
Figure 7:
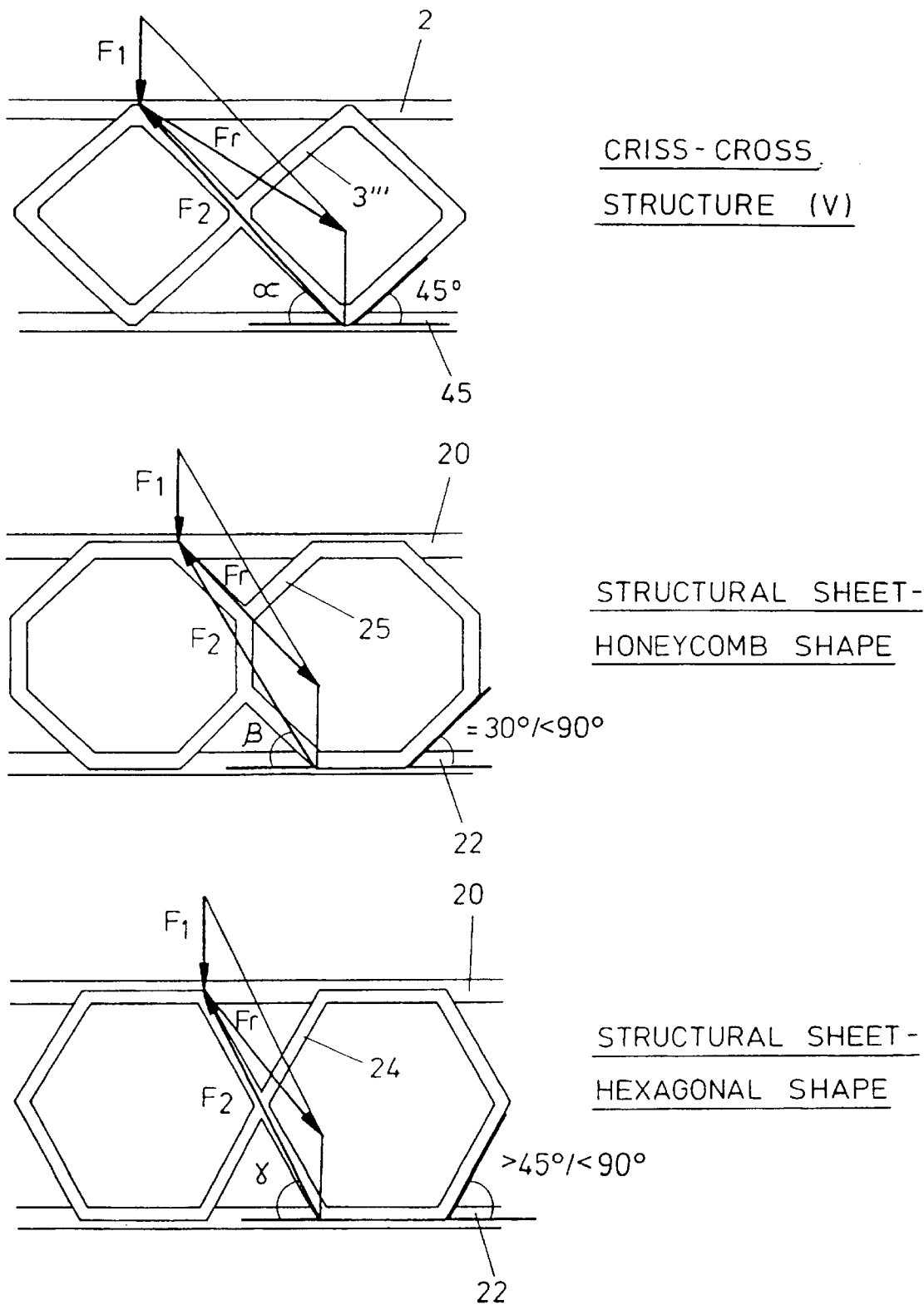
Figure 8:
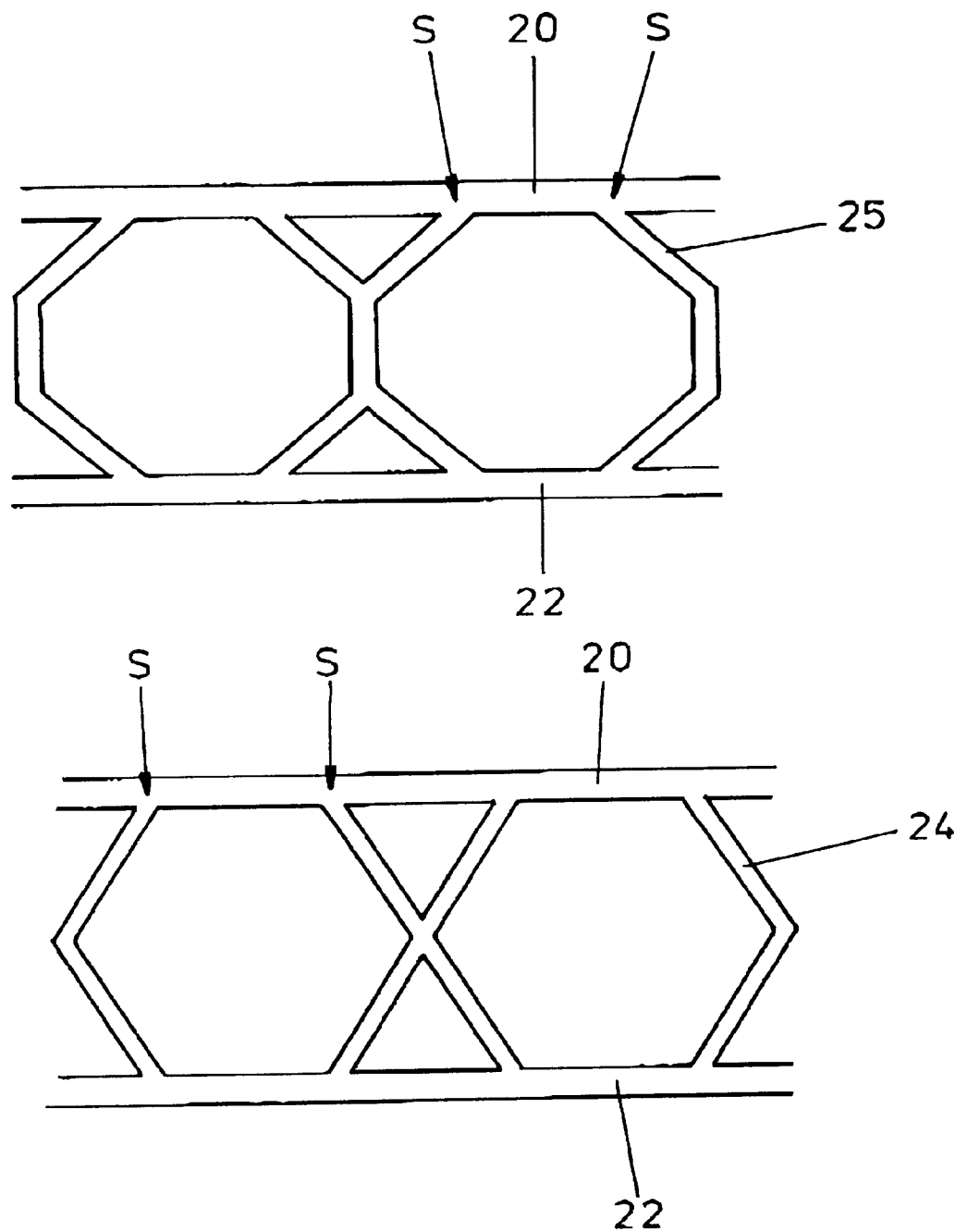

Embodiments of the present invention will now be described, by way of example only, and contrasted with the prior art, with reference to the accompanying drawings in which:

FIG. 1(I) through 1(V) illustrate the cross-sectional shape of a number of conventional sheet structures, FIG. 1(*a*) is a schematic drawings of a production line for a sheet such as that of the present invention, FIG. 2 represents a comparison of the Euler Load Factor for conventional "I" beam and "criss-cross" structures, FIG. 3 represents a comparison of a conventional "V" beam structure with the preferred hexagonal and octagonal structures of the present invention, FIG. 4 represents a comparison of a conventional circular void structure with the preferred hexagonal and octagonal structures of the present invention, FIG. 5 represents a comparison of a conventional "criss-cross" structure with the preferred hexagonal and octagonal structures of the present invention, FIG. 6 compares the pressure distribution for a conventional "criss-cross" structure with that for the structures of the present invention, FIG. 7 compares the parallelogram of forces for a conventional "criss-cross" structure with that for the structures of the present invention, and FIG. 8 illustrates the actual appearance in cross section of the sheet of the present invention.

Referring to the drawings, extruded plastics sheets of the type to which this invention relates conventionally comprise upper and lower sheet faces 2,4 connected together by interconnections 3 defining voids 3*a* therebetween. There have been various different shapes proposed and used—laterally spaced vertical interconnections ("I" beam structure) as shown in FIG. 1(I), a "V" beam structure as shown in FIG. 1(II), a circular voids interconnected structure as shown in FIG. 1(III), a reinforced circular voids interconnected structure as shown in FIG. 1(IV), and a "criss-cross" structure as shown in FIG. 1(V). All these structures include air inlets and associated nettles 5, for cooling purposes.

Figure 1A:
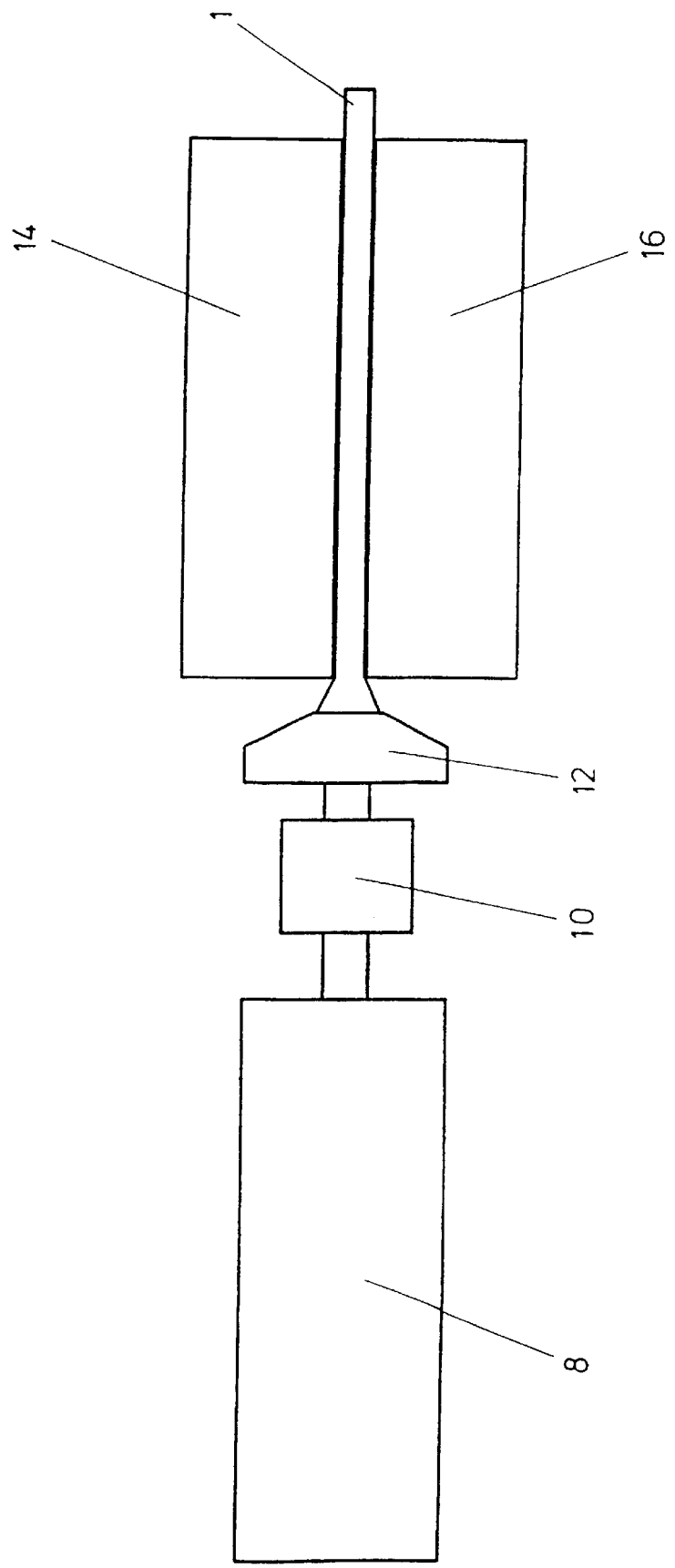

FIG. 1*a* represents a schematic drawing of the production process. Melted plastic material comes from an extruder 8 and passes through a melt pump 10 which stabilises the melt pressure and then enters the die 12 (for examples, one of the die designs represented by the unshaded parts of the drawings of FIG. 1). To cool the sheet 1 a combination of air blown in through air inlets 5 and water cooled plates 14,16 (called a calibrator) are commonly used. To sustain the sheet whilst it is still soft, a vacuum is also applied to the upper and lower plates 14,16, in addition to the air blown through the sheet. This cooling step represents a bottle-neck in the overall production process, and the rate of cooling governs production output. Most of the cooling effect comes from the calibrator, as mentioned previously.

The criss-cross structure shown in FIG. 1(V) utilises the concept shown in FIG. 2 where the mechanical performance of a traditional "I" beam structure is compared with that of the criss-cross structure, using the Euler Load Ratio to evaluate the buckling load performance. The results are as follows:

| "I" Beam Structure | | |
| --- | --- | --- |
| Moment of inertia of area – $I_0$ (mm$^4$) | Euler Buckling load $P_c$ | EULER RATIO |
| 5.3 | 5.3 ($\rho^2$ E/L$^2$) | 1.0 |

| "Criss-cross" Structure | | |
| --- | --- | --- |
| Moment of Inertia of area – $I_0$ (mm$^4$) | Euler Buckling load $P_c$ | EULER RATIO |
| 13.9 | 13.9 ($\rho^2$ E/L$^2$) | 2.6 |

From the above it can be seen that the "criss-cross" structure, with thinner beams and higher overall thickness but having the same weight per square meter, performs three times better than the "I" beam structure, but the latter has much better resistance to vertical compression applied on the contact point S of the beam, whilst the criss-cross gives better performance if the force is applied between two adjacent beams, as is easily demonstrated by using the flat crush test (FCT).

FIGS. 3 to 7 illustrate various different aspects of comparison between the hexagonal and octagonal beam structures 24, 25 being preferred embodiments of the present invention with selected prior art structures.

Referring to FIG. 3, the distance C between adjacent cells (primary voids) is compared for a "V" beam structure 3' and hexagonal 24 and octagonal 25 beam structures of the invention (these are bounded by and integrally formed with upper and lower faces 20,22), as is the distance K ($K_h$, $K_c$) being the size of the upper layer 2 (20) in contact with the primary void and the number of contact point. Thus, one can see that the hexagonal and octagonal beam structures have two contact points S per cell instead of one for the "V" beam, giving better results on FCT, the distance C between adjacent cells is greater for both 24 and 25 than for the "V" beam, giving a lighter sheet, there are more air inlets 23 per square meter giving faster blown air cooling and higher output, and the contact area K<$K_h$<$K_c$, giving faster calibrator cooling and higher output.

FIGS. 4 and 5 show a similar comparison between the two preferred structures of the present invention and the circular voids structure and the "criss-cross" structure respectively.

FIGS. 6 and 7 concentrate on comparing the structures of the present invention with the "criss-cross" structure 3'''.

FIG. 6 illustrates the effect of a force F applied in the middle of the distance D between two adjacent contact points S—one can see that the distance D is less for both the hexagonal and the octagon structures 24, 25 than for the criss-cross structure 3''' (a shorter D means better resistance to compression and a better FCT result).

FIG. 7 shows the resistance of the criss-cross structure 3''' compared with the new structures 24, 25 when a force $F_1$ is applied to the contact point between the outer face and the inner beam structure. $F_2$ represents the reaction force exercised from the structure and $F_1$ represents the resultant force. The closer that $F_1$ approaches to the vertical (i.e perpendicular to the sheet), the stronger is the resistance to compression, so that one must strive to have the angles α, β, and γ as close as possible to 90°. One can see that α<β<γ. Therefore, the octagon structure has to have the angle formed between the beam 25 and the inner surface of the outer layer 22 between 30° and 89°, while the hexagonal structure 24 has to have the same angle between 40° and 89° to obtain the best combination of strength and low weight. The same rule applied to the criss-cross structure would result in comparable mechanical performance, but with a higher weight, due to the increase in the number of beams.

The illustrations in FIGS. 1 through 7 show the internal structure of the sheet shaded differently to the upper and lower faces—this is purely a drawing expedient to emphasise the shape of the internal structure. In fact, the sheet appears in cross section as illustrated in FIG. 8—the internal interconnections or beams are integrally formed with the upper and lower faces during the extrusion process.

What is claimed is:

1. A method of forming a rigid or semi-rigid plastics material sheet having a pair of opposed faces (20, 22) between which run elongate voids, said method comprising the steps of passing melted plastics material through a die (12) followed by cooling using air inlets (15, 23) and calibrated plate (14, 16) characterized by forming the cross-sectional shape of at least some of the voids as a polygon with more than for sides for maximizing air inlets (23) per square meter and forming the contact distances K of the upper and lower walls of the voids greater than that of sheets not having polygonal voids.

2. A method according to claim 1 further defined as forming the polygon as irregular.

3. A method according to claim 2 further defined as forming the interconnections (24, 25) and the primary voids of a repeating pattern of one of regular octagons and hexagons.

4. A method according to claim 3 further defined as joining the primary voids together at one of a side and or an apex.

5. A method according to claim 3 further defined as forming smaller polygonal voids between adjacent primary voids and having a polygonal shape matching the particular shape of the primary voids.

6. A method according to claim 1 further defined as using of a polyolefin, a polyethylene or a polypropylene.

7. A method according to claim 1 further defined as forming the opposed faces (20, 22) as one of external and internal faces.

8. A method according to claim 1 further defined as forming any of the preceding claims wherein at least one associated air inlet point in each void.

* * * * *